US012568368B2

(12) United States Patent
Ancha et al.

(10) Patent No.: US 12,568,368 B2
(45) Date of Patent: Mar. 3, 2026

(54) SYSTEMS AND METHODS FOR ONLINE USER ACTIVITY VERIFICATION AND AUTHENTICATION FOR ENHANCED NETWORK SECURITY

(71) Applicant: PLUME DESIGN, INC., Palo Alto, CA (US)

(72) Inventors: Naveen Ancha, Milpitas, CA (US); Paul White, San Carlos, CA (US)

(73) Assignee: PLUME DESIGN, INC., Palo Alto, CA (US)

( * ) Notice: Subject to any disclaimer, the term of this patent is extended or adjusted under 35 U.S.C. 154(b) by 239 days.

(21) Appl. No.: 18/335,368

(22) Filed: Jun. 15, 2023

(65) Prior Publication Data

US 2024/0422534 A1 Dec. 19, 2024

(51) Int. Cl.
*H04W 12/06* (2021.01)
(52) U.S. Cl.
CPC .................................... *H04W 12/06* (2013.01)
(58) Field of Classification Search
CPC .............................. H04W 12/06; H04W 12/71
See application file for complete search history.

(56) References Cited

U.S. PATENT DOCUMENTS

2017/0034143 A1* 2/2017 Pachouri ............. H04L 63/0807
2017/0331813 A1* 11/2017 Lander ................ H04L 63/0815

2019/0075168 A1 3/2019 Goldfarb et al.
2020/0294049 A1 9/2020 Awasthi
2022/0122087 A1* 4/2022 Gosset ................. G06Q 20/027

OTHER PUBLICATIONS

International Search Report and Written Opinion to corresponding Int'l Appln. No. PCT/US24/33387 mailed Sep. 6, 2024 (16 pages).

* cited by examiner

*Primary Examiner* — Henry Tsang
(74) *Attorney, Agent, or Firm* — Nicholas Martin; Greenberg Traurig, LLP

(57) ABSTRACT

Systems and methods of the present disclosure enable improved network security by authenticating the identity of the user initiating the network activities. A network operations center of a wireless communication network system may implement an authentication service to monitor for network activities initiated via communications through a router of the wireless communication network system. The router may identify communications to be authenticated and provide the communication and/or associated data to the authentication service. The authentication service may analyze the data based on usage and performance data associated with the router(s) as well as user profile data associated with the user to verify that the user is the sender of the communication, thus authenticating the identity of the user. The authentication may then be communicated to third-party entities associated with the network activity to enable such third-party entities to confirm or deny the network activity.

18 Claims, 8 Drawing Sheets

525

SYSTEMS AND METHODS FOR ONLINE USER ACTIVITY VERIFICATION AND AUTHENTICATION FOR ENHANCED NETWORK SECURITY

FIELD OF TECHNOLOGY

The present disclosure generally relates to computer-based systems and/or devices configured for authentication and verification of online activities performed by a user, including wireless communication router management-based user identity verification.

BACKGROUND OF TECHNOLOGY

Conventional Wi-Fi networks are deployed by users in a business, residence(s), public place or other location to provide network connectivity to various devices (e.g., mobile devices, tablets, televisions, Internet of Things (IoT) devices, laptops, media players, and the like). The users obtain network connectivity from their service provider, e.g., Multiple Systems Operators (MSOs), wireless providers, telecom providers, etc. From the service provider perspective, the network connectivity is conventionally seen to the gateway, i.e., cable modem, Digital Subscriber Loop (DSL) modem, wireless Access Point (AP), etc. Conventional Wi-Fi networks are added by the end-user, and there is no visibility into the operation of such networks by the service provider.

When engaging in activities over the Internet using an identity and/or credential, e.g., via a network connection such as a Wi-Fi network, Ethernet, DLS modem, etc., the user needs to provide a few identifying details so that the financial institutions can authenticate and validate the details and transactions. However, conventional mechanisms for collection, verification and analysis of such details can be prone to spoofing, among other drawbacks.

SUMMARY OF DESCRIBED SUBJECT MATTER

Electronic activates initiated and executed between parties, such as online transactions, electronic messaging, and others, may be subject to fraud and/or spoofing by bad actors. Unlike in physical activities, the identity of an actor is often difficult to determine because the actor is not actually present for the activity. Rather, in such electronic activities, the actor instructs a device to perform the activity on the actor's behalf. Thus, authentication and/or validation of the actor's identity is typically performed through complex fraud detection and risk evaluation algorithms to infer whether the actor is indeed who they purport to be.

As disclosed herein, systems and methods provide technically improved network security by enhanced authentication and verification. Through a cloud-based wireless communication networking system, a network operations center may manage one or more routers associated with an entity. Through the establishment of an account and monitoring the performance and activity of the router(s), the network operations center has insight into the identity of individuals on the local network of the router(s). Thus, the network operations center may implement an authentication service to monitor for electronic activities that need to be authenticated, and analysis such electronic activities in view of usage and performance data of the local network as detected by the router(s). Such data in conjunction with entity profile data created by establishing the account may used to verify that the entity performed the electronic activity with a known device, thus authenticating the identity of the entity and the validity of the electronic activity. The authentication may then be provided via the authentication service to third-party entities associated with the electronic activity to enable such third-party entities to confirm or deny the electronic activity with the individual entity in a more efficient and more secure manner.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

DETAILED DESCRIPTION

Figure 1:
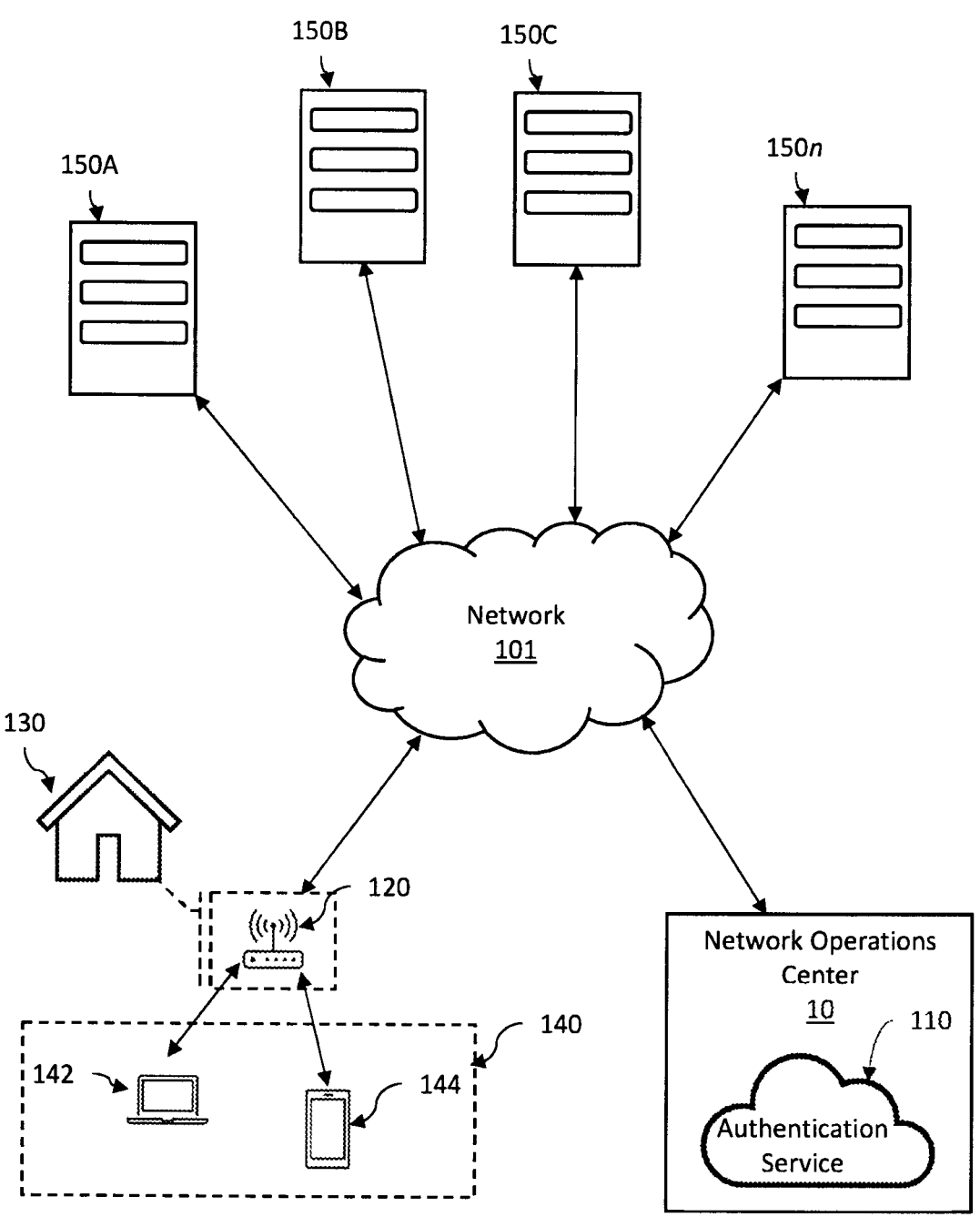
FIG. 1 depicts a system for enhanced authentication via an authentication service of a network operations center in accordance with one or more embodiments of the present disclosure.

Various detailed embodiments of the present disclosure, taken in conjunction with the accompanying FIGs., are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may.

Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the terms "and" and "or" may be used interchangeably to refer to a set of items in both the conjunctive and disjunctive in order to encompass the full description of combinations and alternatives of the items. By way of example, a set of items may be listed with the disjunctive "or", or with the conjunction "and." In either case, the set is to be interpreted as meaning each of the items singularly as alternatives, as well as any combination of the listed items.

FIGS. 1 through 8 illustrate systems and methods of leveraging a network operations center governing a distributed network of wireless communication routers for enhanced verification and authentication of network activities based on user device activity and registration data. The following embodiments provide technical solutions and technical improvements that overcome technical problems, drawbacks and/or deficiencies in the technical fields involving network security and Internet communication security that is typically at risk of spoofing, fraud and other attacks. As explained in more detail, below, technical solutions and technical improvements herein include aspects of improved authentication and verification of user identity and user activities on the network based on the registration of user equipment and performance monitoring of user equipment via a network operations center configured for management of a distributed network of wireless communication routers. Based on such technical features, further technical benefits become available to users and operators of these systems and methods. Moreover, various practical applications of the disclosed technology are also described, which provide further practical benefits to users and operators that are also new and useful improvements in the art.

Referring now to FIG. 1, a system for enhanced authentication via an authentication service of a network operations center is depicted in accordance with one or more embodiments of the present disclosure.

In some embodiments, network activities and/or online activities (collectively, "network activities") may be subject to fraud and/or spoofing by bad actors. Unlike in physical activities, the identity of an actor is often difficult to determine because the actor is not actually present for the activity. Rather, in network activities, the actor instructs a device to perform the activity on the actor's behalf. Thus, authentication and/or validation of the actor's identity is typically performed through complex fraud detection and risk evaluation algorithms to determine whether the actor is indeed who they purport to be.

Indeed, when a user of a user device 140 initiates the network activity, the network activity may be identified as coming from the user device 140 and associated with the user (e.g., via a user account or other identification mechanism), but the network activity may be fraudulent through spoofing, man-in-the-middle or other replay attack, account hacking, device hacking, among others or any combination thereof. Thus, if the user engages in a network activity with an external server 150A, 150B, 105C through 150*n*, the external server 150A, 150B, 105C through 150*n* may take steps to verify that the network activity is actually performed by and/or authorized by the user.

In some embodiments, the term "user" may refer to any entity associated with a device, wireless communication router 120 and/or distributed wireless communication system, including an individual, a business, commercial organization, a non-profit organization, a public organization (e.g., governmental organization), among other entities or any combination thereof.

In some embodiments, the user device 140 may include, e.g., one or more computer devices 142, mobile devices 144, among other devices, including, but not limited to tablets, computers, consumer electronics, home entertainment devices, televisions, IoT devices, or any network-enabled device. For external network connectivity, e.g., via a network 101, one or more of the access points, including the user device 140, can be connected to a wireless communication router 120, which can be a cable modem, Digital Subscriber Loop (DSL) modem, or any device providing external network connectivity to a physical install location 130 associated with the distributed wireless communication system.

In some embodiments, the network 101 may be associated with one or more physical spaces, such as, e.g., a residential, commercial, merchant, public, or other space or any combination thereof. In some embodiments, the network 101 may include a suitable network type, such as, e.g., a public switched telephone network (PTSN), an integrated services digital network (ISDN), a private branch exchange (PBX), a wireless and/or cellular telephone network, a computer network including a local-area network (LAN), a wide-area network (WAN) or other suitable computer network, or any other suitable network or any combination thereof. In some embodiments, a LAN may connect computers and peripheral devices in a physical area by means of links (wires, Ethernet cables, fiber optics, wireless such as Wi-Fi, etc.) that transmit data. In some embodiments, a LAN may include two or more personal computers, printers, and high-capacity disk-storage devices, file servers, or other devices or any combination thereof. LAN operating system software, which interprets input and instructs networked devices, may enable communication between devices to: share the printers and storage equipment, simultaneously access centrally located processors, data, or programs (instruction sets), and other functionalities. Devices on a LAN may also access other LANs or connect to one or more WANs. In some embodiments, a WAN may connect computers and smaller networks to larger networks over greater geographic areas. A WAN may link the computers by means of cables, optical fibers, or satellites, cellular data networks, or other wide-area connection means. In some embodiments, an example of a WAN may include the Internet.

In some embodiments, a network operations center 10 may use an authentication service 110 to verify and authenticate the user and/or the network activity for the external server 150A, 150B, 105C through 150*n* based on wireless communication router management data associated with a wireless communication router 120 through which the user device 140 is connected to perform the network activity with the external server 150A, 150B, 105C through 150*n*.

In some embodiments, the wireless communication router 120 may be part of a distributed Wi-Fi system can operate in accordance with the IEEE 802.11 protocols and variations thereof. The distributed wireless communication system includes a plurality of access points, which can be distributed throughout a location, such as a residence, office, or the like. That is, the distributed wireless communication system contemplates operation in any physical location where it is inefficient or impractical to service with a single access point, repeaters, or a mesh system. As described herein, the distributed wireless communication system can be referred to as a network, a system, a Wi-Fi network, a Wi-Fi system, a cloud-based system, etc. The access points can be referred to as nodes, access points, Wi-Fi nodes, Wi-Fi access points, etc. The objective of the access points is to provide network connectivity to the user device 140. The user device 140 can be referred to as client devices, user devices, clients, Wi-Fi clients, Wi-Fi devices, etc.

In a typical deployment (e.g., in a residential, commercial, merchant, public, or other space or any combination thereof), the distributed wireless communication system can include between 3 to 12 access points or more in a home. In some embodiments, a large number of access points (which can also be referred to as nodes in the distributed wireless communication system) ensures that the distance between any access point is always small, as is the distance to any user device 140 needing Wi-Fi service. That is, an objective of the distributed wireless communication system can be for distances between the access points to be of similar size as distances between the user device 140 and the associated access point. Such small distances ensure that every corner of a consumer's home is well covered by Wi-Fi signals. It also ensures that any given hop in the distributed wireless communication system is short and goes through few walls. This results in very strong signal strengths for each hop in the distributed wireless communication system, allowing the use of high data rates, and providing robust operation.

In some embodiments, while providing excellent coverage, a large number of access points (nodes) presents a coordination problem. Getting all the access points configured correctly and communicating efficiently requires centralized control. In some embodiments, the network operations center 10 may provide control that can be reached across the network 101 and accessed remotely, such as through an application ("app") running on a user device 140. The running of the distributed wireless communication system, therefore, becomes what is commonly known as a "cloud service." In some embodiments, the network operations center 10 may be configured to receive measurement data, to analyze the measurement data, and to configure the access points in the distributed wireless communication system based thereon, through the network operations center 10. In some embodiments, the network operations center 10 may also be configured to determine which access point each of the user device 140 connect (associate) with. That is, in an example aspect, the distributed wireless communication system includes cloud-based control (with a cloud-based controller or cloud service in the cloud) to optimize, configure, and monitor the operation of the access points and the user device 140. This cloud-based control is contrasted with a conventional operation that relies on a local configuration, such as by logging in locally to an access point. In the distributed wireless communication system, the control and optimization may be effectuated by logging into the user device 140 (or a local user device 140) communicating with the network operations center 10 cloud, such as via a disparate network (a different network than the distributed wireless communication system) (e.g., LTE, another Wi-Fi network, etc.).

In some embodiments, the wireless communication router 120 and/or any access points can include both wireless links and wired links for connectivity. In some embodiments, the wireless communication router 120 may have a gigabit Ethernet (GbE) wired connection to the network 101 (e.g., via network provider connection such as a telecommunications carrier, fiber and/or cable network operator, etc.). In some embodiments, the wireless communication router 120 may also or alternatively have a wired connection and/or wireless connection to the network 101. Similarly, in some embodiments, the user device 140 may connect to the network 101 via the wireless communication router 120 with one or more wired and/or wireless connections to the wireless communication router 120. In some embodiments, the wireless connection(s) may include one or more of Bluetooth™, near-field wireless communication (NFC), RFID, Narrow Band Internet of Things (NBIOT), 3G, 4G, 5G, GSM, GPRS, WiFi, WiMax, CDMA, satellite, ZigBee, Z-Wave, Thread, LoRAN, among others or any combination thereof. In some embodiments, the wired connection(s) may include one or more of Ethernet, universal serial bus (USB), coaxial cable, fiber optic cabling, PCI express, small computer system interface (SCSI), parallel AT attachment (PATA), serial AT attachment (SATA), HyperTransport™, InfiniBand™, Wishbone, Compute Express Link (CXL), among others or any combination thereof.

In some embodiments, the network operations center 10 is configured to configure or otherwise manage the distributed wireless communication system, including the wireless communication router 120 and/or the user device 140 via cloud-based management. In some embodiments, the configuration may be through a software agent installed in each device or the like, e.g., OpenSync. As described herein, cloud-based management includes reporting of wireless communication-related performance metrics to the network operations center 10 as well as receiving wireless communication-related configuration parameters from the network operations center 10. The systems and methods contemplate use with any wireless communication system, such as, e.g., a Wi-Fi system (e.g., the distributed wireless communication system, a single access point system, a Wi-Fi mesh network, a Wi-Fi repeater network, among others or any combination thereof), including systems that only support reporting of Wi-Fi related performance metrics (and not supporting cloud-based configuration).

In some embodiments, through management of the wireless communication router 120, the network operations center 10 may build and/or maintain profiles of each device connecting to the network 101 via the wireless communication router 120, including the wireless communication router 120 itself. In some embodiments, such profiles may include user and/or device data including, e.g., device identifier (ID), a media access control (MAC) address, Internet protocol (IP) address, device location, address and/or zip code associated with the install location 130, address and/or zip code provided by an Internet service provider or other network operator or any combination thereof, a device state (e.g., on/off, connected/disconnected, etc.), performance state (e.g., signal strength of wireless communications associated with the wireless communication router 120, distance from the wireless communication router 120, etc.) among other data and/or attributes associated with the user device 140 and/or the wireless communication router 120 or any combination thereof.

Accordingly, in some embodiments, when a user engages in a network activity, including an electronic activity performed across the network 101, e.g., with the external server(s) 150A-150n, the wireless communication router 120 and/or the network operations center 10 may detect the network activity and determine a verification and/or authentication indicative of the authenticity of the network activity and its performance by or with consent of the user. In some embodiments, the network activity may be initiation by a network communication issued by the user device 140. In some embodiments, the network communication may include network communication data representing attributes of the network activity, including, e.g., a user identifier identifying the user, a third-party entity identifier identifying a third-party entity associated with the external server(s) 150A-150*n*, a network address associated with the user device 140, a network address associated with the external server(s) 150A-150*n*, an activity type identifier, an activity value or activity quantity, a time data item, a location data item, a date data item, a device type or device identifier associated with the user device 140 and/or the external server(s) 150A-150*n*, an activity description, or other attributes representing characteristics of each data entry.

For example, in some embodiments, the network activity may include a transaction with an online commerce (ecom-merce) platform, such as a purchase of a product, service and/or subscription. Thus, the network activity communica-tion data may include transaction data such as, e.g., a uniform resource locator (URL) associated with the external server(s) 150A-150*n* and/or a payment processor URL, a user name associated with the transaction, a user address and/or zip code associated with the transaction, an IP address of the user device 140 used to send the network activity communication to initiate the network activity including the transaction, among other data or any combination thereof.

In some embodiments, as part of the management of the wireless communication system including the wireless com-munication router 120, the network operations center 10 may automatically collect metadata and characteristics asso-ciated with communications over the network 101. Thus, the network operations center 10 may automatically retrieve from the wireless communication router 120 the user and/or device data as detailed above. Thus, the wireless commu-nication router 120 and/or the network operations center 10 may extract the network activity communication data from the network activity communication, and compare the net-work activity communication data to the profile and the user and/or device data stored therein.

In some embodiments, based on the similarity of the network activity communication data to the profile an authentication service 110 may assess authenticity and/or risk of fraud associated with the network activity. For example, in some embodiments, the authentication service 110 may produce a binary indication of, e.g., high risk and low risk, fraud likely and fraud unlikely, confirm and deny, match and no match, or other suitable formulation of the network activity communication data being the same as or different from the profile. In another example, the authen-tication service 110 may generate a risk score indicative of a degree of risk of fraud based on a degree of similarity between the network activity communication data and the user and/or device data of the profile. In some embodiments, the similarity may be assessed according to a number of data items that match compared to a number of data items that do not match.

In some embodiments, the similarity between the network activity communication data and the data of the profile and/or whether each data item of the network activity communication data matches a correspond data item of the profile may be measured according to one or more similarity measures. In some embodiments, the measure of similarity may include, e.g., an exact match or a predetermined simi-larity score according to, e.g., Jaccard similarity, Jaro- Winkler similarity, Cosine similarity, Euclidean similarity, Overlap similarity, Pearson similarity, Approximate Nearest Neighbors, K-Nearest Neighbors, among other similarity measure. The predetermined similarity score may be any suitable similarity score according to the type of electronic activity to identify a measured attribute of any two data entries as the same.

In some embodiments, similarity may be measured between each individual data item separately, and the respective similarity scores summed, averaged, or otherwise combined to produce a measure of similarity between the network activity communication data and the data of the profile. In some embodiments, the similarity may instead or in addition be measured for a combination of the device identifier, device type identifier and location identifier. For example, a hash or group key may be generated by com-bining the device identifier, device type identifier and loca-tion identify. The hash may include a hash functioning take as input each of attribute or a subset of attributes of a particular data entry. The group key may be produced by creating a single string, list, or value from combining each of, e.g., a string, list or value representing each individual attribute of the particular data entry. The similarity between the network activity communication data and the data of the profile may then be measured as the similarity between the associated hashes and/or group keys.

In some embodiments, the risk score and/or binary risk label may be determined based on the similarity measure. In some embodiments, the risk score and/or binary risk label may be formulated by one or more risk algorithms, including machine learning models, such as, e.g., a logic rules-based algorithm, a convolutional neural network (CNN), recurrent neural network (RNN), generative adversarial network (GAN), a Naive Bayes classifier, decision trees, random forest, support vector machine (SVM), K-Nearest Neigh-bors, or any other machine learning model or any combi-nation thereof.

In some embodiments, the risk algorithm(s) may use the similarity measure as input as well as one or more additional data items. For example, a device state and/or performance data associated with the user device 140 and/or the wireless communication router 120 may be indicative of whether the user device 140 was actually used to create the network activity communication as opposed to a fraudulent or spoofed network activity communication, such as, e.g., using a man-in-the-middle attack. For example, where the device state is "off", the risk algorithm(s) may elevate the risk score based on one or more learned and/or predefined algorithm parameters.

In some embodiments, upon determining the risk, the authentication service 110 may provide the risk score and/or risk label to the external server(s) 150A-150*n* associated with the network activity. In some embodiments, the exter-nal server(s) 150A-150*n* may query the authentication ser-vice 110 via one or more computer interfaces. In some embodiments, the one or more computer interfaces may utilize one or more software computing interface technolo-gies, such as, e.g., Common Object Request Broker Archi-tecture (CORBA), an application programming interface (API) and/or application binary interface (ABI), among others or any combination thereof. In some embodiments, an API and/or ABI defines the kinds of calls or requests that can be made, how to make the calls, the data formats that should be used, the conventions to follow, among other require-ments and constraints. An "application programming inter-face" or "API" can be entirely custom, specific to a com-ponent, or designed based on an industry-standard to ensure interoperability to enable modular programming through information hiding, allowing users to use the interface independently of the implementation. In some embodiments, CORBA may normalize the method-call semantics between application objects residing either in the same address-space (application) or in remote address-spaces (same host, or remote host on a network).

Accordingly, in some embodiments, the external server(s) 150A-150n may query, via the computer interface, the authentication service 110 upon receiving a network activity communication. In some embodiments, in response to the query, the authentication service 110 may return the risk score/label associated with the network activity communication data such that the external server(s) 150A-150n may authorize or reject the network activity based on the risk score/label.

Figure 2:
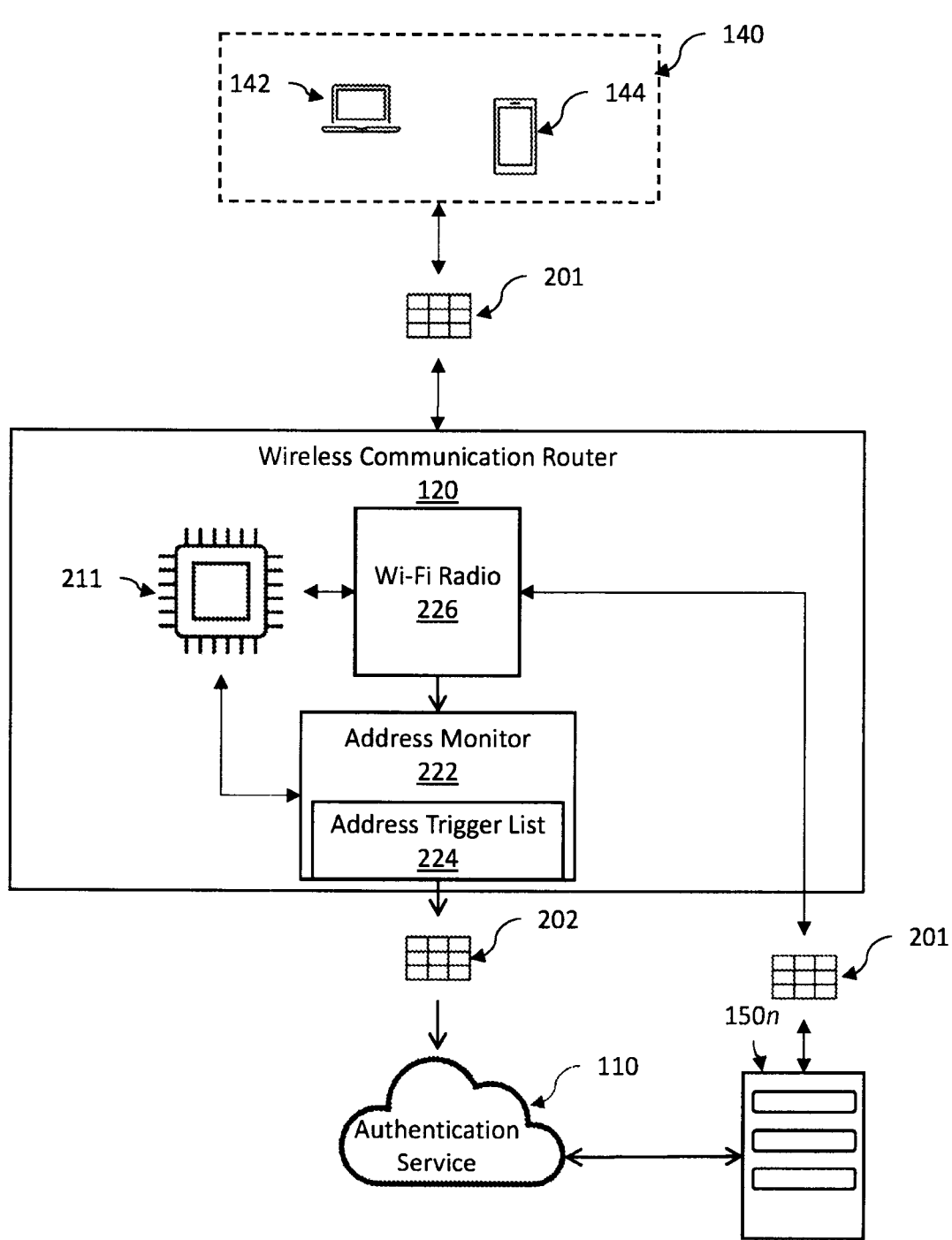
FIG. 2 depicts a Wi-Fi router associated with the network operations center and configured for authentication and validation of network activities in accordance with one or more embodiments of the present disclosure.

Referring now to FIG. 2, a wireless communication router associated with the network operations center and configured for authentication and validation of network activities is depicted in accordance with one or more embodiments of the present disclosure.

In some embodiments, to improve the efficiency of authentication service 110, the wireless communication router 120 may be configured to filter network communications from the user device 140 to determine if a particular network communication is to be tested for authenticity and/or validity, thus reducing traffic to the authentication service 110.

Accordingly, in some embodiments, the wireless communication router 120 may include a wireless radio, such as a Wi-Fi radio 226. In some embodiments, the Wi-Fi radio 226 may include radio frequency communication components, such as a receiver, a transmitter, a transceiver, and/or one or more processing components. In some embodiments, the Wi-Fi radio 226 may be a hardware defined radio, a software define radio, or any combination thereof. In some embodiments, the Wi-Fi radio 226 may be controlled by a processor 211. In some embodiments, the processor 211 may include any type of data processing capacity, such as a hardware logic circuit, for example an application specific integrated circuit (ASIC) and a programmable logic, or such as a computing device, for example, a microcomputer or microcontroller that include a programmable microprocessor. In some embodiments, the processor 211 may include data-processing capacity provided by the microprocessor. In some embodiments, the microprocessor may include memory, processing, interface resources, controllers, and counters. In some embodiments, the microprocessor may also include one or more programs stored in memory.

In some embodiments, the user device 140 may be connected to the network 101 via the wireless communication router 120, and thus the Wi-Fi radio 226 may receive a network activity communication 201 from the user device 140 in order to send the network activity communication 201 to a destination thereof, including the external server 150A-150n. To do so, the Wi-Fi radio 226 may extract from the network activity communication 201 a destination address identifying a network address to which the network activity communication 201 is destined. In some embodiments, the destination address may include an IP address, DNS address, MAC address, or other network address or any combination thereof.

In some embodiments, the wireless communication router 120 may be configured with an address monitor 222. The address monitor 222 may include a software and/or hardware configuration, e.g., managed by the network operations center 10, that enables the wireless communication router

120 to monitor and/or filter address associated with network communications. As a result, upon receiving the network activity communication 201, the address monitor 222 may analyze the extracted destination address against an address trigger list 224.

In some embodiments, the address trigger list 224 may include a list of network address that are configured to trigger authentication and validation by the authentication service 110. In some embodiments, the address trigger list 224 may include the network address of each external server 150A-150n with which the user may perform a network activity. In some embodiments, the address trigger list 224 may include the network address of each external server 150A-150n that has enrolled with the network operations center 10 to query the authentication service 110. For example, one or more financial institutions may enroll for the authentication service 110 as a supplemental fraud check. Thus, the network address, such as a URL, of each financial institution may be added to the address trigger list 224.

In some embodiments, the network operations center 10 may push updates to the wireless communication router 120 to add new network addresses, or remove network addresses from the address trigger list 224. In some embodiments, the network operations center 10 may push periodic updates based on a predetermined schedule, such as, e.g., daily, weekly, biweekly, monthly, quarterly, or by another suitable period or any combination thereof. In some embodiments, the network operations center 10 may push on-demand updates upon a new entity enrolling with the authentication service 110. Thus, any time a new entity enrolls with the authentication service 110, the network operations center 10 may identify the network address of the new entity, add the network address to the address trigger list 224, and push an updated to the wireless communication router 120 and any other wireless communication router connected to the network 101 to add the network address to the address trigger list 224 in each wireless communication router.

In some embodiments, the address monitor 222 may include one or more software and/or hardware components controlled and/or executed by the processor 211. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

As a result, upon the Wi-Fi radio 226 receiving the network activity communication 201, the address monitor 222 may be executed to extract the network address of the destination of the network activity communication 201 and determine whether the network address triggers authentication and validation based on the address trigger list 224. To do so, the address monitor 222 may access the address trigger list 224, e.g., in a memory, storage, database or other data store or any combination thereof, and compare the network address to each address in the address trigger list 224.

In some embodiments, the address monitor 222 may determine that the network address matches an address trigger in the address trigger list 224 based on the network address being an exact match to an address in the address trigger list 224 (e.g., the URL, DNS address and/or IP address of each is the same). Alternatively, or in addition, a similarity between the network address and each address in the address trigger list 224 may be measured using a similarity measure, such as those detailed above. Where the similarity exceeds a predetermined threshold, the address monitor 222 may determine that the network address matches an address in the address trigger list 224.

In some embodiments, upon determining that the network address matches an address in the address trigger list 224, the address monitor 222 may extract the network activity communication data 202 from the network activity communication 201. Otherwise, the address monitor 222 may forward the network activity communication 201 without extracting the network activity communication data 202 for routing to the destination.

In some embodiments, the address monitor 222 may send the network activity communication data 202 and/or the network activity communication 201 itself to the network operations center 10 for analysis by the authentication service 110. In some embodiments, instead of extracting the network activity communication data 202, the address monitor 222 may send the network activity communication 201 itself to the authentication service 110 such that the authentication service 110 extracts the network activity communication data 202 to offload processing from the constrained resources of the wireless communication router 120 to the network operations center 10.

In some embodiments, the wireless communication router 120 may also send the network activity communication 201 to the destination server of the external servers 150A-150n concurrently with sending the network activity communication data 202 and/or the network activity communication 201 to the network operations center 10 for analysis by the authentication service 110. Thus, upon receipt of the network activity communication 201, the destination server of the external servers 150A-150n may query the authentication service 110 to obtain the risk score and/or label of the authentication and validation performed by the authentication service 110.

Figure 3:
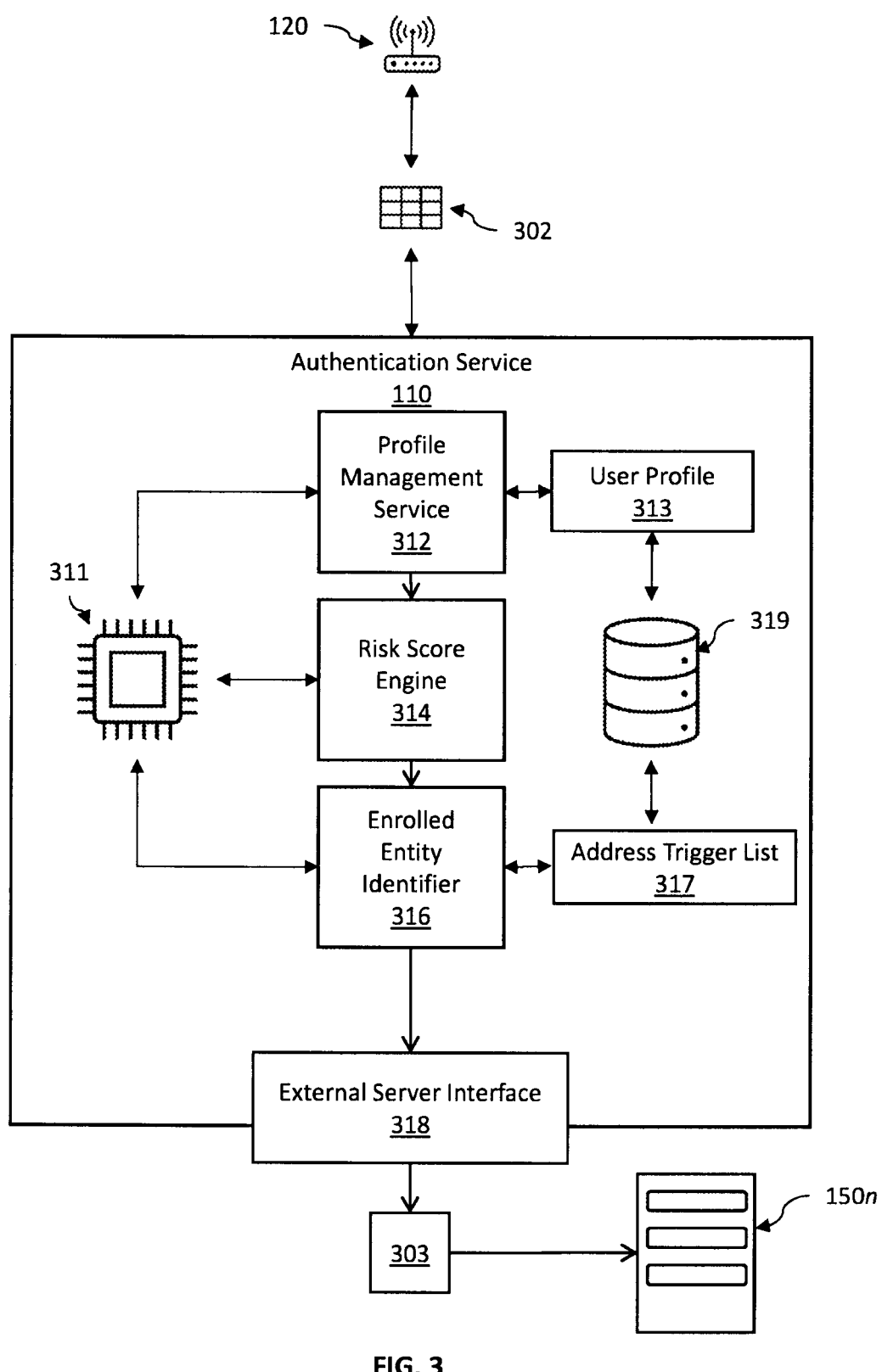
FIG. 3 depicts an authentication service for authenticating network activities based on Wi-Fi router data in accordance with one or more embodiments of the present disclosure.

Referring now to FIG. 3, an authentication service for authenticating network activities based on wireless communication router data is depicted in accordance with one or more embodiments of the present disclosure.

In some embodiments, as detailed above, the wireless communication router 120 may determine whether the network activity communication 201 is destined for a network address of an entity enrolled with the authentication service

110. Upon doing so, the wireless communication router 120 may extract and communicate, e.g., across the network 101, the network activity communication data 302 from the network activity communication 201.

In some embodiments, the authentication service 110 may include hardware components such as a processor 311, which may include local or remote processing components. In some embodiments, the processor 311 may include any type of data processing capacity, such as a hardware logic circuit, for example an application specific integrated circuit (ASIC) and a programmable logic, or such as a computing device, for example, a microcomputer or microcontroller that include a programmable microprocessor. In some embodiments, the processor 311 may include data-processing capacity provided by the microprocessor. In some embodiments, the microprocessor may include memory, processing, interface resources, controllers, and counters. In some embodiments, the microprocessor may also include one or more programs stored in memory.

Similarly, the authentication service 110 may include storage 319, such as one or more local and/or remote data storage solutions such as, e.g., local hard-drive, solid-state drive, flash drive, database or other local data storage solutions or any combination thereof, and/or remote data storage solutions such as a server, mainframe, database or cloud services, distributed database or other suitable data storage solutions or any combination thereof. In some embodiments, the storage 319 may include, e.g., a suitable non-transitory computer readable medium such as a physical data storage device, e.g., random access memory (RAM), read only memory (ROM), one or more buffers and/or caches, among other memory devices or any combination thereof.

In some embodiments, the authentication service 110 may implement computer engines for accessing and analyzing user profiles 313, generating a risk score based on the user profile 313 and the network activity communication data 302, identify an enrolled entity associated with the network activity communication data 302 and interface with the external server 150n of the enrolled entity. In some embodiments, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

In some embodiments, to access and analyze user profiles 313, generate a risk score based on the user profile 313 and the network activity communication data 302, identify an enrolled entity associated with the network activity communication data 302 and interface with the external server 150n of the enrolled entity, the authentication service 110 may include computer engines including, e.g., a profile management service 312, risk score engine 314, an enrolled entity identifier 316 and an external server interface 318. In some embodiments, the profile management service 312, risk score engine 314, an enrolled entity identifier 316 and an external server interface 318 may each include dedicated and/or shared software components, hardware components, or a combination thereof. For example, the profile management service 312, risk score engine 314, an enrolled entity identifier 316 and an external server interface 318 may each include a dedicated processor and storage. However, in some embodiments, profile management service 312, risk score engine 314, an enrolled entity identifier 316 and an external server interface 318 may each share hardware resources, including the processor 311 and storage 319 of the authentication service 110.

In some embodiments, the profile management service 312 may identify a user profile 313 associated with the network activity communication data. In some embodiments, the profile management service 110 may identify a router ID the wireless communication router 120 and/or identify a source device including a device ID, IP address and/or application ID of the user device 140. The profile management service 312 may use the router ID and/or the device ID, IP address and/or application ID to query the storage 319. In some embodiments, the storage 319 may include a database and/or memory structure that stores user profiles such that the query using the router ID and/or the device ID, IP address and/or application ID may be used to return the user profile 313.

For example, in some embodiments, a user may establish the user profile 313 with the network operations center 10 to enable the network operations center to manage and configure the wireless communication router 120. Based on the user profile 313, the user may access one or more dashboards and/or visualizations provided by the network operations center 10 in order to view and/or manage the wireless communication router 10, view performance metrics, establish parameters, restrictions and other settings, among other management and/or configuration tasks. In some embodiments, the user may also manage devices, including the user device 140, that is detected on a local network established by the wireless communication router 120. For example, the user may establish permissions, deny permissions, register, de-register or otherwise manage a relationship between the user device 140 and the wireless communication router 120 and the user profile 313. For example, the user may select the user device 140 in a network topology map and/or list of detect devices and register the user device 140 as a device associated with the user.

As a result, the user profile 313 may include a list of known and/or trusted devices on the local network. In some embodiments, the user profile 313 may additionally or alternatively include user and/or user device 140 related data such as, e.g., device ID, application ID of an application installed on the user device 140, current IP address, current MAC address, a universally unique identifier (UUID) associated with the user device 140, current and/or historical network location(s), current and/or historical geographic location, zip code, address, username, among other user profile data or any combination thereof.

In some embodiments, the profile management service 312 may provide the user profile data and the network activity communication data 302 to the risk score engine 314. In some embodiments, the risk score engine 314 may analyze the user profile data and the network activity communication data 302 to determine a likelihood of the authenticity of the user with respect to the network activity communication 201. Accordingly, in some embodiments, the risk score engine 314 may perform user identify verification processes including assessing the similarity of the source device identified in the network activity communication data 302 and the device ID registered in the user profile 313. Similarly, the risk score engine 314 may assess the similarity between network/geographic location specified in the network activity communication data 302 and the network/geographic location registered or detected in the user profile 313. In some embodiments, some or all of the data items in the network activity communication data 302 may be compared to corresponding data registered in the user profile 313.

In some embodiments, as detailed above, similarity may be measured according to a similarity measure, such as, e.g., Jaccard similarity, Jaro-Winkler similarity, Cosine similarity, Euclidean similarity, Overlap similarity, Pearson similarity, Approximate Nearest Neighbors, K-Nearest Neighbors, among other similarity measure. Alternatively, or in addition, similarity may be a binary label between an exact match or not an exact match. Accordingly, in some embodiments, the risk score engine 314 may output a risk score based on the similarity. For example, for a binary label of risk, the risk score engine 314 may determine the risk score to be authenticated or not authenticated based on a match or not a match, respectively.

In some embodiments, for the binary label of risk, the risk score of authenticated may be determined where there is a match for all network activity communication data 302 for which there is corresponding data in the user profile. In some embodiments, for the binary label of risk, the risk score of authenticated may be determined where there is a match for a predetermined minimum number of data items in the network activity communication data 302 for which there is corresponding data in the user profile. In some embodiments, for the risk score, the risk score of authenticated may be determined where there is a similarity measure satisfying a predetermined minimum similarity of the data items in the network activity communication data 302 for which there is corresponding data in the user profile.

In some embodiments, the risk score may be a numerical score on a predetermined scale (e.g., 0 to 3, 1 to 3, 0 to 5, 1 to 5, 0 to 10, 1 to 10, 0.0 to 1.0, 0 to 100, 1 to 100, or other scale or any combination thereof. In some embodiments, the numerical score may be based on the similarity measure, such as, e.g., proportionally, logarithmically, exponentially, or according to any other relationship or any combination thereof. In some embodiments, the numerical score may be calculated based on one or more modifiers. The modifier(s)

may include, e.g., device state, device performance state, time since last use of the user device 140, among other modifiers or any combination thereof.

In some embodiments, before, during or after the risk score engine 314, the enrolled entity identifier 316 may receive the network activity communication data 302 and determine an entity and/or external server 150*n* associated with the network activity communication 201. The storage 319 may store an address trigger list 317, similar to the address trigger list 217 detailed above. Accordingly, the storage 319 may store a list of entities enrolled with the authentication service 110 for supplemental authentication indicators for network activities. In some embodiments, each entry in the address trigger list 317 may include one or more identifiers identifying the enrolled entity, the external server 150*n* of the enrolled entity, a network address of the external server 150*n*, and/or an external server interface 318 configured to interface with the external server 150*n* of the enrolled entity. Accordingly, the enrolled entity identifier 316 may query the storage 319 to identify the enrolled entity, the network address of the external server 150*n*, and/or the external server interface 318 configured to interface with the external server 150*n* of the enrolled entity associated with the network activity communication data 302 based on the destination address specified in the network activity communication data 302.

In some embodiments, upon identifying the enrolled entity, the network address of the external server 150*n*, and/or the external server interface 318 configured to interface with the external server 150*n* of the enrolled entity and the risk score engine 314 producing the risk score, the enrolled entity identifier 316 may provide the risk score to the external server interface 318 associated with the enrolled entity. In some embodiments, the external server interface 318 may include one or more software and/or hardware interfaces, including those detailed above. In some embodiments, the external server interface 318 may be configured to push risk score data 303 indicative of the risk score and/or the network activity communication data 302 to the external server 150*n* of the enrolled entity. Thus, the external server interface 318 may be configured to push risk score data 303 automatically, e.g., via a publish-subscribe messaging paradigm and/or via an automated API call, or by another messaging technique or any combination thereof.

In some embodiments, alternatively or in addition, the external server interface 318 may provide the risk score data 303 upon request by the external server 150*n*. Accordingly, the external server interface 318 may queue the risk data 303 in a message queue and/or message buffer pending a request by the external server 150*n*. In some embodiments, therefore, the external server 150*n* may issue a query to the external server interface 318, e.g., upon the external server 150*n* receiving the network activity communication 201. In response to the query, the external server interface 318 may transmit a response carrying the risk data 303 to provide the indication of authenticity of the network activity communication 201 to the external server 150*n*.

Figure 4:
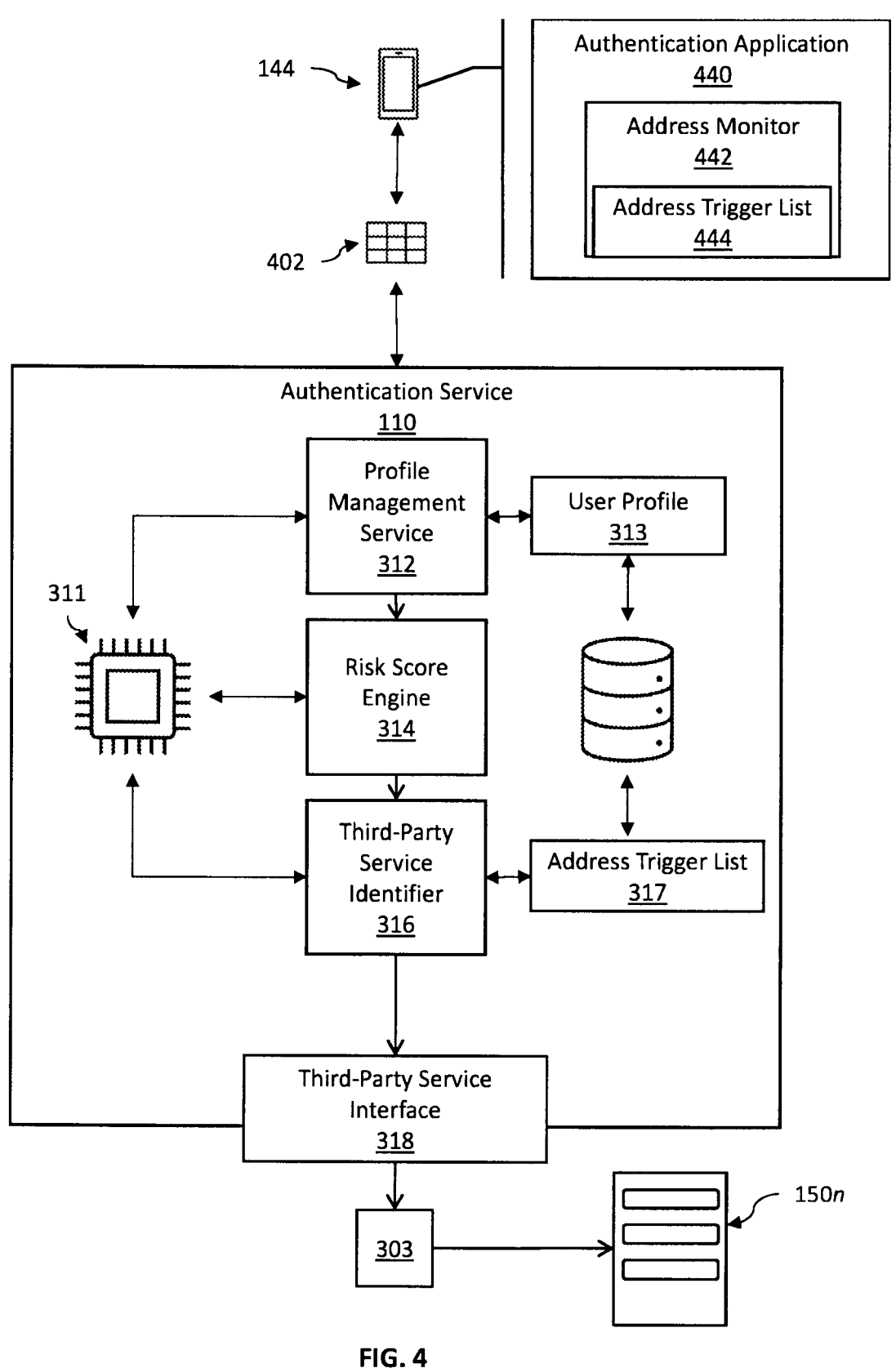
FIG. 4 depicts an authentication service for authenticating network activities based on data form a Wi-Fi router-registered user device in accordance with one or more embodiments of the present disclosure.

Referring now to FIG. 4, an authentication service for authenticating network activities based on data form a wireless communication router-registered user device is depicted in accordance with one or more embodiments of the present disclosure.

In some embodiments, the user device 140 may send a network activity communication while being remote from the wireless communication router 120. In some embodiments, to enable the authentication service 110 to perform authentication and validation on the network activity communications, the user device 144 may have an authentication application 440 installed thereon. In some embodiments, the authentication application 440 may be associated with the user profile 413 of the user and the wireless communication router associated with the user. In some embodiments, the authentication application 440 may be configured with an address monitor 442 having an address trigger list 444 similar to the address monitor 222 having an address trigger list 224 of the wireless communication router 120 as detailed above with reference to FIG. 2.

In some embodiments, the address monitor 442 may include a software and/or hardware configuration, e.g., managed by the network operations center 10, that enables the user device 140 to monitor and/or filter address associated with network communications. As a result, upon generating and/or sending the network activity communication, the address monitor 442 may analyze the extracted destination address against an address trigger list 444.

In some embodiments, the address trigger list 444 may include a list of network address that are configured to trigger authentication and validation by the authentication service 110. In some embodiments, the address trigger list 444 may include the network address of each external server 150A-150*n* with which the user may perform a network activity. In some embodiments, the address trigger list 444 may include the network address of each external server 150A-150*n* that has enrolled with the network operations center 10 to query the authentication service 110. For example, one or more financial institutions may enroll for the authentication service 110 as a supplemental fraud check. Thus, the network address, such as a URL, of each financial institution may be added to the address trigger list 444.

In some embodiments, the network operations center 10 may push updates to the user device 140 to add new network addresses, or remove network addresses from the address trigger list 444. In some embodiments, the network operations center 10 may push periodic updates based on a predetermined schedule, such as, e.g., daily, weekly, biweekly, monthly, quarterly, or by another suitable period or any combination thereof. In some embodiments, the network operations center 10 may push on-demand updates upon a new entity enrolling with the authentication service 110. Thus, any time a new entity enrolls with the authentication service 110, the network operations center 10 may identify the network address of the new entity, add the network address to the address trigger list 444, and push an updated to the user device 140 and any other wireless communication router and/or user device connected to the network 101 to add the network address to the address trigger list 444 in each wireless communication router and/or user device.

In some embodiments, the address monitor 442 may include one or more software and/or hardware components controlled and/or executed by the user device 140. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

As a result, upon the user selecting, e.g., via a graphical user interface, to create and/or send the network activity communication, the address monitor 442 may be executed to determine whether the network address triggers authentication and validation based on the address trigger list 444. To do so, the address monitor 442 may access the address trigger list 444, e.g., in a memory, storage, database or other data store or any combination thereof, and compare the network address of destination of the network activity communication to each address in the address trigger list 444.

In some embodiments, the address monitor 442 may determine that the network address matches an address trigger in the address trigger list 444 based on the network address being an exact match to an address in the address trigger list 444 (e.g., the URL, DNS address and/or IP address of each is the same). Alternatively, or in addition, a similarity between the network address and each address in the address trigger list 444 may be measured using a similarity measure, such as those detailed above. Where the similarity exceeds a predetermined threshold, the address monitor 442 may determine that the network address matches an address in the address trigger list 444.

In some embodiments, because the network activity communication is generated on the user device 140, extraction of the network activity communication data from the network activity communication may be omitted. Instead, upon determining that the network address matches an address in the address trigger list 444, the address monitor 442 may the user device 140 may send a copy of the network activity communication data 402 and/or the network activity communication itself to the network operations center 10 for analysis by the authentication service 110. Where the network address does not match an address in the address trigger list 444, the address monitor 442 may forward the network activity communication without extracting the network activity communication data 202 for routing to the destination.

In some embodiments, the address monitor 442 may send the network activity communication data 402 and/or the network activity communication itself to the network operations center 10 for analysis by the authentication service 110. In some embodiments, instead of extracting the network activity communication data 402, the address monitor 442 may send the network activity communication itself to the authentication service 110 such that the authentication service 110 extracts the network activity communication data 402 to offload processing from the constrained resources of the user device 140 to the network operations center 10.

In some embodiments, similar to as detailed above with reference to FIG. 3, the authentication service 110 may determine an authenticity of the user with respect to the network activity communication. Accordingly, the profile management service 312 may identify a user profile 313 associated with the network activity communication data 402. In some embodiments, the profile management service 110 may identify a router ID the wireless communication router 120 and/or identify a source device including a device ID, IP address and/or application ID of the user device 140. The profile management service 312 may use the router ID and/or the device ID, IP address and/or application ID to query the storage 319. In some embodiments, the storage 319 may include a database and/or memory structure that stores user profiles such that the query using the router ID and/or the device ID, IP address and/or application ID may be used to return the user profile 313.

As a result, the user profile 313 may include a list of known and/or trusted devices on the local network. In some embodiments, the user profile 313 may additionally or alternatively include user and/or user device 140 related data such as, e.g., device ID, application ID of an application installed on the user device 140, current IP address, current MAC address, a UUID associated with the user device 140, current and/or historical network location(s), current and/or historical geographic location, zip code, address, username, among other user profile data or any combination thereof.

In some embodiments, the profile management service 312 may provide the user profile data and the network activity communication data 302 to the risk score engine 314. In some embodiments, the risk score engine 314 may analyze the user profile data and the network activity communication data 302 to determine a likelihood of the authenticity of the user with respect to the network activity communication data 402. Accordingly, in some embodiments, the risk score engine 314 may perform user identify verification processes including assessing the similarity of the source device identified in the network activity communication data 302 and the device ID registered in the user profile 313. Similarly, the risk score engine 314 may assess the similarity between network/geographic location specified in the network activity communication data 302 and the network/geographic location registered or detected in the user profile 313. In some embodiments, some or all of the data items in the network activity communication data 302 may be compared to corresponding data registered in the user profile 313.

In some embodiments, before, during or after the risk score engine 314, the enrolled entity identifier 316 may receive the network activity communication data 302 and determine an entity and/or external server 150n associated with the network activity communication data 402. The storage 319 may store an address trigger list 317, similar to the address trigger list 317 detailed above. Accordingly, the storage 319 may store a list of entities enrolled with the authentication service 110 for supplemental authentication indicators for network activities. In some embodiments, each entry in the address trigger list 317 may include one or more identifiers identifying the enrolled entity, the external server 150n of the enrolled entity, a network address of the external server 150n, and/or an external server interface 318 configured to interface with the external server 150n of the enrolled entity. Accordingly, the enrolled entity identifier 316 may query the storage 319 to identify the enrolled entity, the network address of the external server 150n, and/or the external server interface 318 configured to interface with the external server 150n of the enrolled entity associated with the network activity communication data 302 based on the destination address specified in the network activity communication data 302.

In some embodiments, upon identifying the enrolled entity, the network address of the external server 150n, and/or the external server interface 318 configured to interface with the external server 150n of the enrolled entity and the risk score engine 314 producing the risk score, the enrolled entity identifier 316 may provide the risk score to the external server interface 318 associated with the enrolled entity. In some embodiments, the external server interface 318 may include one or more software and/or hardware interfaces, including those detailed above. In some embodiments, the external server interface 318 may be configured to push risk score data 303 indicative of the risk score and/or the network activity communication data 302 to the external server 150*n* of the enrolled entity. Thus, the external server interface 318 may be configured to push risk score data 303 automatically, e.g., via a publish-subscribe messaging paradigm and/or via an automated API call, or by another messaging technique or any combination thereof.

In some embodiments, alternatively or in addition, the external server interface 318 may provide the risk score data 303 upon request by the external server 150*n*. Accordingly, the external server interface 318 may queue the risk data 303 in a message queue and/or message buffer pending a request by the external server 150*n*. In some embodiments, therefore, the external server 150*n* may issue a query to the external server interface 318, e.g., upon the external server 150*n* receiving the network activity communication data 402. In response to the query, the external server interface 318 may transmit a response carrying the risk data 303 to provide the indication of authenticity of the network activity communication data 402 to the external server 150*n*.

Figure 5:
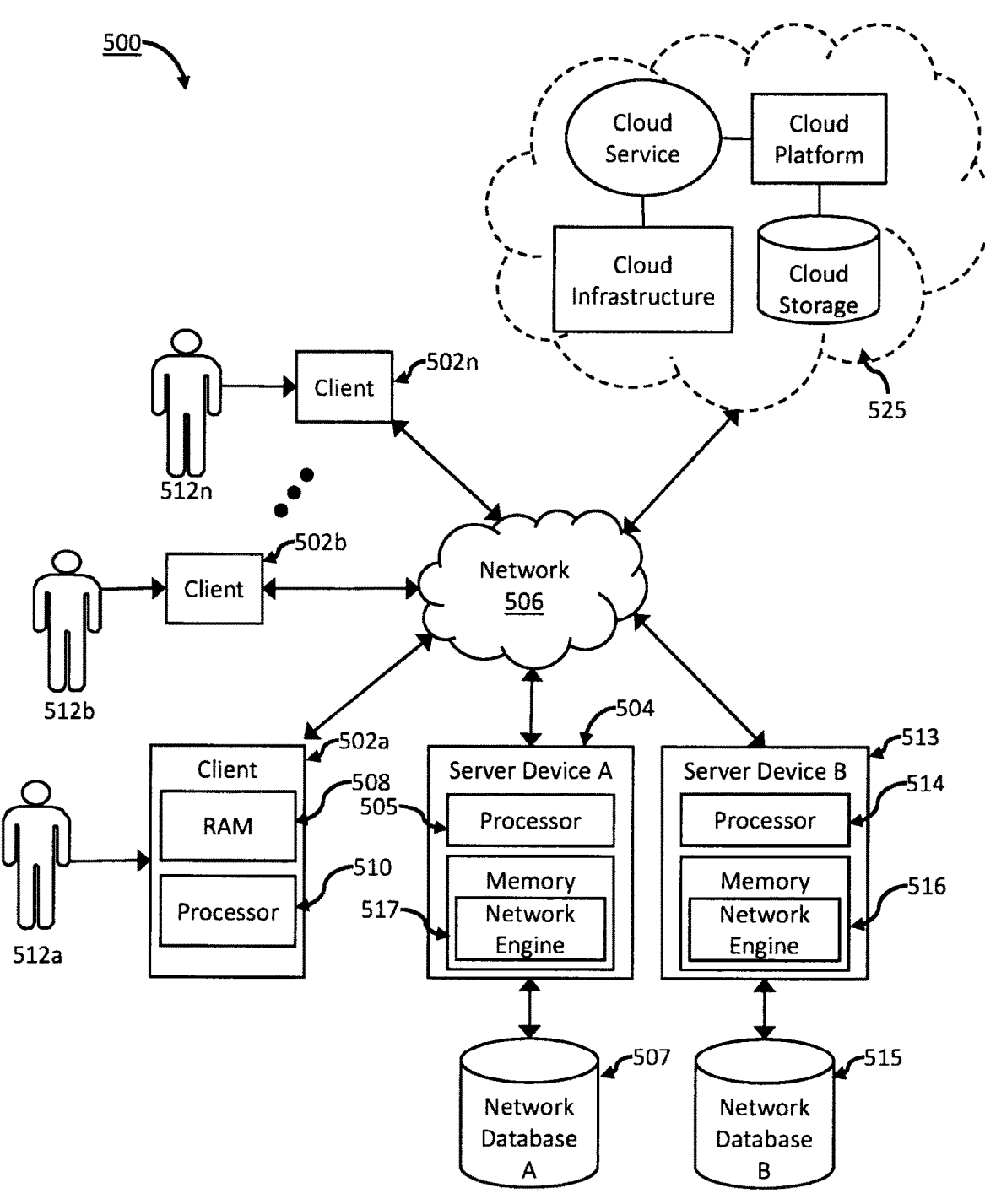
FIG. 5 depicts a block diagram of another exemplary computer-based system and platform in accordance with one or more embodiments of the present disclosure.

FIG. 5 depicts a block diagram of another exemplary computer-based system and platform 500 in accordance with one or more embodiments of the present disclosure. However, not all of these components may be required to practice one or more embodiments, and variations in the arrangement and type of the components may be made without departing from the spirit or scope of various embodiments of the present disclosure.

In some embodiments, the client device 502*a*, client device 502*b* through client device 502*n* shown each at least includes a computer-readable medium, such as a random-access memory (RAM) 508 coupled to a processor 510 or FLASH memory. In some embodiments, the processor 510 may execute computer-executable program instructions stored in memory 508. In some embodiments, the processor 510 may include a microprocessor, an ASIC, and/or a state machine. In some embodiments, the processor 510 may include, or may be in communication with, media, for example computer-readable media, which stores instructions that, when executed by the processor 510, may cause the processor 510 to perform one or more steps described herein.

In some embodiments, examples of computer-readable media may include, but are not limited to, an electronic, optical, magnetic, or other storage or transmission device capable of providing a processor, such as the processor 510 of client device 502*a*, with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Perl, JavaScript, and etc.

In some embodiments, client devices 502*a* through 502*n* may also comprise a number of external or internal devices such as a mouse, a CD-ROM, DVD, a physical or virtual keyboard, a display, or other input or output devices. In some embodiments, examples of client devices 502*a* through 502*n* (e.g., clients) may be any type of processor-based platforms that are connected to a network 506 such as, without limitation, personal computers, digital assistants, personal digital assistants, smart phones, pagers, digital tablets, laptop computers, Internet appliances, and other processor-based devices. In some embodiments, client devices 502*a* through 502*n* may be specifically programmed with one or more application programs in accordance with one or more principles/methodologies detailed herein. In some embodiments, client devices 502*a* through 502*n* may operate on any operating system capable of supporting a browser or browser-enabled application, such as Microsoft™, Windows™, and/or Linux. In some embodiments, client devices 502*a* through 502*n* shown may include, for example, personal computers executing a browser application program such as Microsoft Corporation's Internet Explorer™, Apple Computer, Inc.'s Safari™, Mozilla Firefox, and/or Opera. In some embodiments, through the member computing client devices 502*a* through 502*n*, user 512*a*, user 512*b* through user 512*n*, may communicate over the exemplary network 506 with each other and/or with other systems and/or devices coupled to the network 506. As shown in FIG. 5, exemplary server devices 504 and 513 may include processor 505 and processor 514, respectively, as well as memory 517 and memory 516, respectively. In some embodiments, the server devices 504 and 513 may be also coupled to the network 506. In some embodiments, one or more client devices 502*a* through 502*n* may be mobile clients.

In some embodiments, at least one database of exemplary databases 507 and 515 may be any type of database, including a database managed by a database management system (DBMS). In some embodiments, an exemplary DBMS-managed database may be specifically programmed as an engine that controls organization, storage, management, and/or retrieval of data in the respective database. In some embodiments, the exemplary DBMS-managed database may be specifically programmed to provide the ability to query, backup and replicate, enforce rules, provide security, compute, perform change and access logging, and/or automate optimization. In some embodiments, the exemplary DBMS-managed database may be chosen from Oracle database, IBM DB2, Adaptive Server Enterprise, FileMaker, Microsoft Access, Microsoft SQL Server, MySQL, PostgreSQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In some embodiments, the exemplary DBMS-managed database may be specifically programmed to include metadata about the data that is stored.

Figure 6:
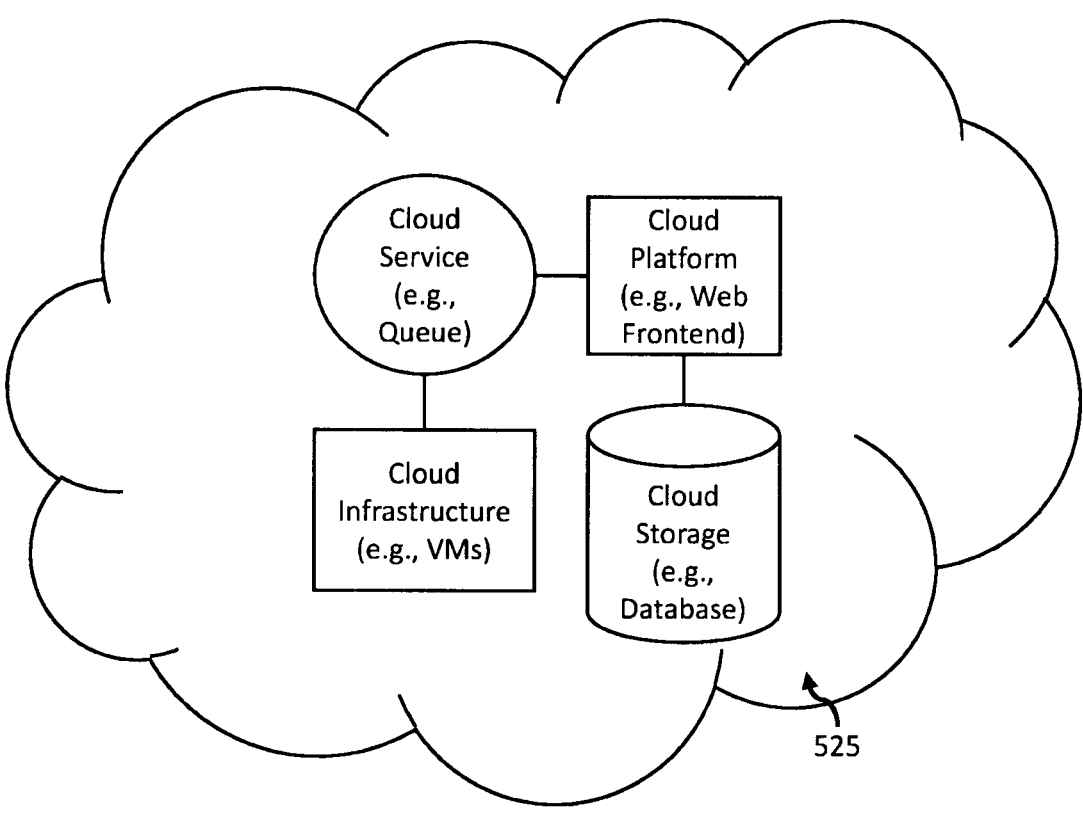
FIG. 6 depicts illustrative schematics of an exemplary implementation of the cloud computing/architecture(s) in which can be specifically configured to operate in accordance with some embodiments of the present disclosure.
Figure 7:
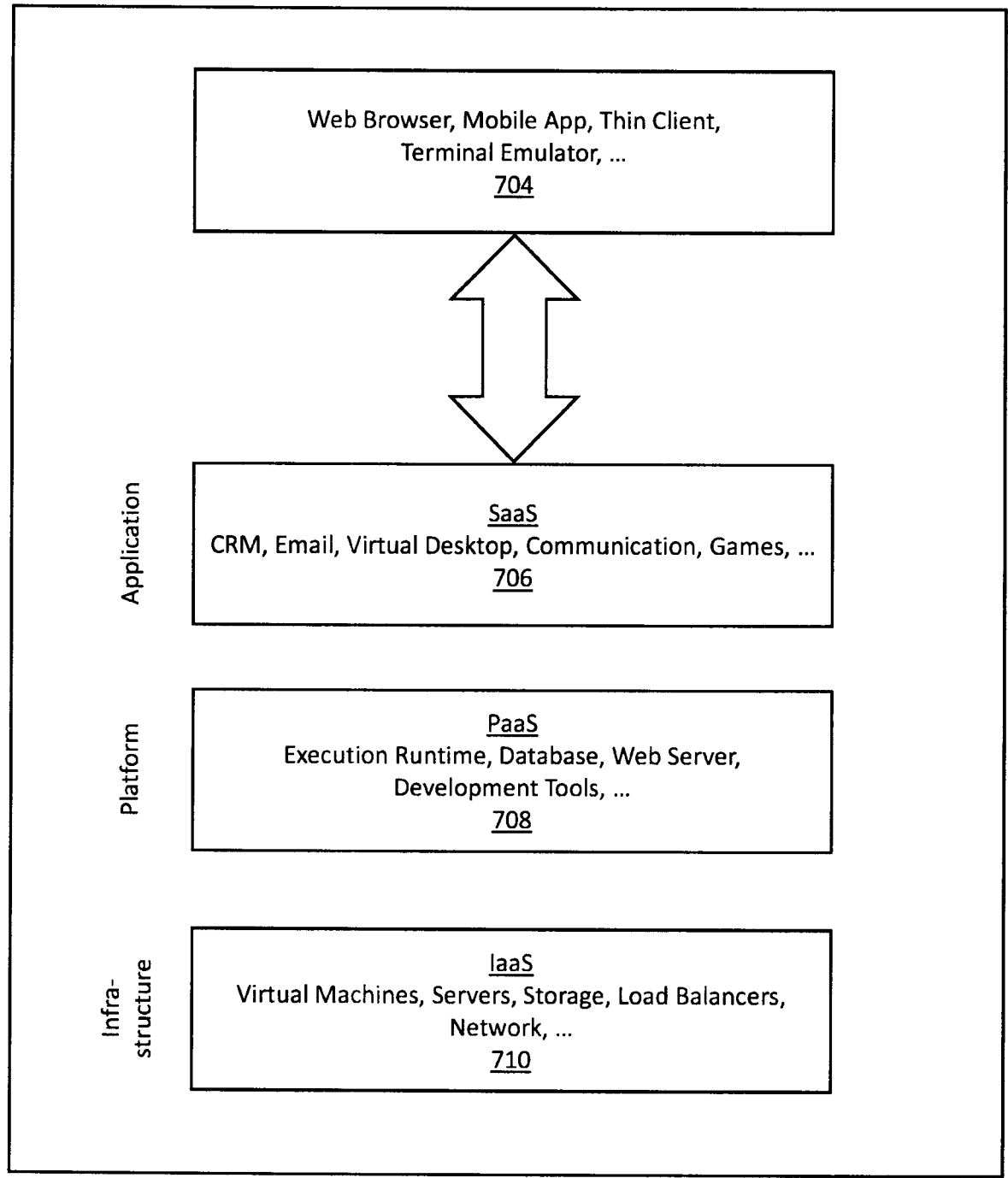
FIG. 7 depicts illustrative schematics of another exemplary implementation of the cloud computing/architecture(s) which can be specifically configured to operate in accordance with some embodiments of the present disclosure.

In some embodiments, the exemplary inventive computer-based systems/platforms, the exemplary inventive computer-based devices, and/or the exemplary inventive computer-based components of the present disclosure may be specifically configured to operate in a cloud computing/architecture 525 such as, but not limiting to: infrastructure a service (IaaS) 710, platform as a service (PaaS) 708, and/or software as a service (SaaS) 706 using a web browser, mobile app, thin client, terminal emulator or other endpoint 704. FIGS. 6 and 7 illustrate schematics of exemplary implementations of the cloud computing/architecture(s) in which the exemplary inventive computer-based systems/platforms, the exemplary inventive computer-based devices, and/or the exemplary inventive computer-based components of the present disclosure may be specifically configured to operate.

Figure 8:
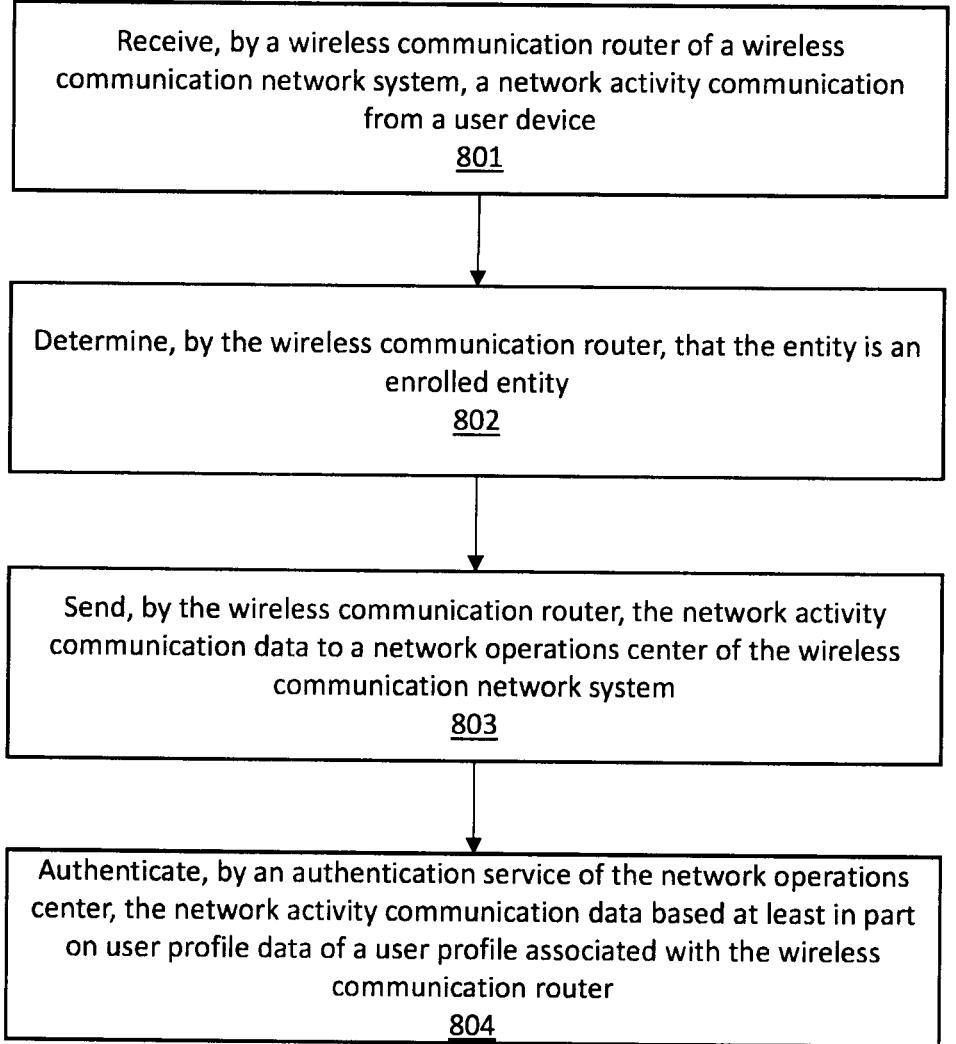
FIG. 8 depicts a flow chart illustrating a method for enhanced authentication via an authentication service of a network operations center in accordance with one or more embodiments of the present disclosure.

FIG. 8 illustrates a flowchart of an illustrative methodology in accordance with one or more embodiments of the present disclosure.

In some embodiments, a wireless communication network system include a network operations center for management of a wireless communication router. The wireless communication network system may be configured to leverage user profile data of a user registered with network operations center to authenticate and validate that the user is the true sender of a network activity communication, where the network activity communication is configured to initiate a network activity with an entity.

Accordingly, in some embodiments, at block 801, the wireless communication router of the wireless communication network system may receive the network activity communication from a user device of the user. The user device may be connected to a network, such as the Internet, via a local network of the wireless communication router. The network activity communication may include network activity communication data defining the network activity.

At block 802, the wireless communication router may determine that the entity is an enrolled entity based on the network activity communication data. To do so, the wireless communication router may extract the network activity communication data from the network activity communication.

At block 803, the wireless communication router may send the network activity communication data to the network operations center of the wireless communication network system. The network operations center may include the authentication service for authenticating the network activity communication based on the network activity communication data.

At block 804, the authentication service of the network operations center may authenticate the network activity communication data based at least in part on user profile data of a user profile associated with the wireless communication router. Accordingly, the authentication service may determine a user profile associated with the network activity communication data based at least in part on at least one of: the wireless communication router, and/or the user device. The user profile may include user profile data representing one or more user-related attributes, such as a device ID of the user device, a network address (e.g., IP address) of the user device, a geographic and/or network address of the user device, a geographic location of the user, an address of the user, a name of the user, among other attributes or any combination thereof.

The authentication server may determine a similarity of the network activity communication data to the user profile data and determine a user authentication indicator based at least in part on the similarity. The authentication server may then communicate the user authentication indicator to the external server of the enrolled entity so as to authenticate an identity of the user.

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "dynamically" and term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

In some embodiments, exemplary inventive, specially programmed computing systems and platforms with associated devices are configured to operate in the distributed network environment, communicating with one another over one or more suitable data communication networks (e.g., the Internet, satellite, etc.) and utilizing one or more suitable data communication protocols/modes such as, without limitation, IPX/SPX, X.25, AX.25, AppleTalk™, TCP/IP (e.g., HTTP), near-field wireless communication (NFC), RFID, Narrow Band Internet of Things (NBIOT), 3G, 4G, 5G, GSM, GPRS, WiFi, WiMax, CDMA, satellite, ZigBee, and other suitable communication modes.

In some embodiments, the NFC can represent a short-range wireless communications technology in which NFC-enabled devices are "swiped," "bumped," "tap" or otherwise moved in close proximity to communicate. In some embodiments, the NFC could include a set of short-range wireless technologies, typically requiring a distance of 10 cm or less. In some embodiments, the NFC may operate at 13.56 MHZ on ISO/IEC 18000-3 air interface and at rates ranging from 106 kbit/s to 424 kbit/s. In some embodiments, the NFC can involve an initiator and a target; the initiator actively generates an RF field that can power a passive target. In some embodiment, this can enable NFC targets to take very simple form factors such as tags, stickers, key fobs, or cards that do not require batteries. In some embodiments, the NFC's peer-to-peer communication can be conducted when a plurality of NFC-enable devices (e.g., smartphones) within close proximity of each other.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

In some embodiments, one or more of illustrative computer-based systems or platforms of the present disclosure may include or be incorporated, partially or entirely into at least one personal computer (PC), laptop computer, ultra-laptop computer, tablet, touch pad, portable computer, hand-held computer, palmtop computer, personal digital assistant (PDA), cellular telephone, combination cellular telephone/ PDA, television, smart device (e.g., smart phone, smart tablet or smart television), mobile internet device (MID), messaging device, data communication device, and so forth.

As used herein, the term "mobile electronic device," or the like, may refer to any portable electronic device that may or may not be enabled with location tracking functionality (e.g., MAC address, Internet Protocol (IP) address, or the like). For example, a mobile electronic device can include, but is not limited to, a mobile phone, Personal Digital Assistant (PDA), Blackberry™, Pager, Smartphone, or any other reasonable mobile electronic device.

As used herein, term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

As used herein, terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user).

In some embodiments, as detailed herein, one or more of the computer-based systems of the present disclosure may obtain, manipulate, transfer, store, transform, generate, and/ or output any digital object and/or data unit (e.g., from inside and/or outside of a particular application) that can be in any suitable form such as, without limitation, a file, a contact, a task, an email, a message, a map, an entire application (e.g., a calculator), data points, and other suitable data. In some embodiments, as detailed herein, one or more of the computer-based systems of the present disclosure may be implemented across one or more of various known or to be known computer platforms such as, but not limited to: (1) FreeBSD, NetBSD, OpenBSD; (2) Linux; (3) Microsoft Windows™; (4) OpenVMS™; (5) OS X (MacOS™); (6) UNIX™; (7) Android; (8) iOS™; (9) Embedded Linux; (10) Tizen™; (11) WebOS™; (12) Adobe AIR™; (13) Binary Runtime Environment for Wireless (BREW™); (14) Cocoa™ (API); (15) Cocoa™ Touch; (16) Java™ Platforms; (17) JavaFX™; (18) QNX™; (19) Mono; (20) Google Blink; (21) Apple WebKit; (22) Mozilla Gecko™; (23) Mozilla XUL; (24) .NET Framework; (25) Silverlight™; (26) Open Web Plat- form; (27) Oracle Database; (28) Qt™; (29) SAP NetWeaver™; (30) Smartface™; (31) Vexi™; (32) Kubernetes™ and (33) Windows Runtime (WinRT™) or other suitable computer platforms or any combination thereof.

In some embodiments, illustrative computer-based systems or platforms of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

In some embodiments, illustrative computer-based systems or platforms of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, or objects. For example, such projections may be a visual overlay for a mobile augmented reality (MAR) application.

As used herein, terms "proximity detection," "locating," "location data," "location information," and "location tracking" refer to any form of location tracking technology or locating method that can be used to provide a location of, for example, a particular computing device, system or platform of the present disclosure and any associated computing devices, based at least in part on one or more of the following techniques and devices, without limitation: accel- erometer(s), gyroscope(s), Global Positioning Systems (GPS); GPS accessed using Bluetooth™; GPS accessed using any reasonable form of wireless and non-wireless communication; WiFi™ server location data; Bluetooth™ based location data; triangulation such as, but not limited to, network based triangulation, WiFi™ server information based triangulation, Bluetooth™ server information based triangulation; Cell Identification based triangulation, Enhanced Cell Identification based triangulation, Uplink- Time difference of arrival (U-TDOA) based triangulation, Time of arrival (TOA) based triangulation, Angle of arrival (AOA) based triangulation; techniques and systems using a geographic coordinate system such as, but not limited to, longitudinal and latitudinal based, geodesic height based, Cartesian coordinates based; Radio Frequency Identification such as, but not limited to, Long range RFID, Short range RFID; using any form of RFID tag such as, but not limited to active RFID tags, passive RFID tags, battery assisted passive RFID tags; or any other reasonable way to determine location. For ease, at times the above variations are not listed or are only partially listed; this is in no way meant to be a limitation.

In some embodiments, the illustrative computer-based systems or platforms of the present disclosure may be configured to securely store and/or transmit data by utilizing one or more of encryption techniques (e.g., private/public key pair, Triple Data Encryption Standard (3DES), block cipher algorithms (e.g., IDEA, RC2, RC5, CAST and Skipjack), cryptographic hash algorithms (e.g., MD5, RIPEMD-160, RTR0, SHA-1, SHA-2, Tiger (TTH), WHIRLPOOL, RNGs).

As used herein, the term "user" shall have a meaning of at least one user. In some embodiments, the terms "user", "subscriber" "consumer" or "customer" should be understood to refer to a user of an application or applications as described herein and/or a consumer of data supplied by a data provider. By way of example, and not limitation, the terms "user" or "subscriber" can refer to a person who receives data provided by the data or service provider over the Internet in a browser session, or can refer to an automated software application which receives the data and stores or processes the data.

The aforementioned examples are, of course, illustrative and not restrictive.

At least some aspects of the present disclosure will now be described with reference to the following numbered clauses.

Clause 1. A method comprising: receiving, by a wireless communication router of a wireless communication network system, a network activity communication from a user device; wherein the network activity communication comprises network activity communication data; the network activity communication being configured to initiate a network activity with an external server of an entity; wherein the user device is on a local network of the wireless communication router; extracting, by the wireless communication router, the network activity communication data from the network activity communication; determining, by the wireless communication router, that the entity is an enrolled entity based at least in part on the network activity communication data and a trigger address list specifying a plurality of network addresses of a plurality of enrolled entities; sending, by the wireless communication router, the network activity communication data to a network operations center of the wireless communication network system; wherein the network operations center is configured to manage the wireless communication network system; wherein the network operations center comprises an authentication service configured to: receive the network activity communication data; determine a user profile associated with the network activity communication data based at least in part on at least one of: the wireless communication router, or the user device; wherein the user profile comprises user profile data; determine a similarity of the network activity communication data to the user profile data; determine a user authentication indicator based at least in part on the similarity; and communicate the user authentication indicator to the external server of the enrolled entity so as to authenticate an identity of the user.

Clause 2. The method of clause 1, wherein the user profile data comprises device ID associated with the user device, and the network activity communication data comprises a source device ID. Clause 3. The method of clause 1, wherein the similarity comprises whether the network activity communication data is an exact match to the user profile data.

Clause 4. The method of clause 1, wherein the similarity comprises a similarity measure indicative of a degree of a match between the network activity communication data and the user profile data.

Clause 5. The method of clause 1, wherein the user authentication indicator comprises a binary risk label indicating the network activity communication as authenticated or not authenticated.

Clause 6. The method of clause 1, wherein the user authentication indicator comprises a risk score indicating a degree of risk of the user not being authentic, wherein the risk score is a numerical value on a predetermined scale.

Clause 7. The method of clause 1, wherein the authentication service is further configured to: queue the user authentication indicator in a message queue associated with the enrolled entity; and communicate the user authentication indicator to the external server of the enrolled entity in response to a query associated with the network activity communication from the external server to the authentication service Clause 8. The method of clause 1, further comprising: transmitting, by the wireless communication router, the network activity communication to the external server.

Clause 9. A method comprising: receiving, by a user device of a wireless communication network system, via at least one graphical user interface, at least one user selection defining network activity communication data of a network activity communication to an external server of an entity, the network activity communication being configured to initiate a network activity with the external server; wherein the user device is associated with a wireless communication router of the wireless communication network system; determining, by the user device, that the entity is an enrolled entity based at least in part on the network activity communication data and a trigger address list specifying a plurality of network addresses of a plurality of enrolled entities; sending, by the user device, the network activity communication data to a network operations center of the wireless communication network system; wherein the network operations center is configured to manage the wireless communication network system; wherein the network operations center comprises an authentication service configured to: receive the network activity communication data; determine a user profile associated with the network activity communication data based at least in part on at least one of: the wireless communication router associated with the user device, or the user device; wherein the user profile comprises user profile data; determine a similarity of the network activity communication data to the user profile data; determine a user authentication indicator based at least in part on the similarity; and communicate the user authentication indicator to the external server of the enrolled entity so as to authenticate an identity of the user.

Clause 10. The method of clause 9, wherein the user profile data comprises device ID associated with the user device, and the network activity communication data comprises a source device ID.

Clause 11. The method of clause 9, wherein the similarity comprises whether the network activity communication data is an exact match to the user profile data.

Clause 12. The method of clause 9, wherein the similarity comprises a similarity measure indicative of a degree of a match between the network activity communication data and the user profile data.

Clause 13. The method of clause 9, wherein the user authentication indicator comprises a binary risk label indicating the network activity communication as authenticated or not authenticated.

Clause 14. The method of clause 9, wherein the user authentication indicator comprises a risk score indicating a degree of risk of the user not being authentic, wherein the risk score is a numerical value on a predetermined scale.

Clause 15. The method of clause 9, wherein the authentication service is further configured to: queue the user authentication indicator in a message queue associated with the enrolled entity; and communicate the user authentication indicator to the external server of the enrolled entity in response to a query associated with the network activity communication from the external server to the authentication service Clause 16. The method of clause 9, further comprising: transmitting, by the user device, the network activity communication to the external server.

Clause 17. A wireless communication network system comprising: a wireless communication router associated with a user; wherein the wireless communication router is configured to: receive a network activity communication from a user device; wherein the network activity communication comprises network activity communication data; the network activity communication being configured to initiate a network activity with an external server of an entity; wherein the user device is on a local network of the wireless communication router; extract the network activity communication data from the network activity communication; determine that the entity is an enrolled entity based at least in part on the network activity communication data and a trigger address list specifying a plurality of network addresses of a plurality of enrolled entities; send the network activity communication data to a network operations center of the wireless communication network system; and a network operations center configured to manage the wireless communication router and the user device; wherein the network operations center comprises an authentication service configured to: receive the network activity communication data; determine a user profile associated with the network activity communication data based at least in part on at least one of: the wireless communication router associated with the user device, or the user device; wherein the user profile comprises user profile data; determine a similarity of the network activity communication data to the user profile data; determine a user authentication indicator based at least in part on the similarity; and communicate the user authentication indicator to the external server of the enrolled entity so as to authenticate an identity of the user.

Clause 18. The wireless communication network system of clause 17, wherein the user authentication indicator comprises a binary risk label indicating the network activity communication as authenticated or not authenticated.

Clause 19. The wireless communication network system of clause 17, wherein the authentication service is further configured to: queue the user authentication indicator in a message queue associated with the enrolled entity; and communicate the user authentication indicator to the external server of the enrolled entity in response to a query associated with the network activity communication from the external server to the authentication service Clause 20. The wireless communication network system of clause 17, further comprising: transmitting, by the wireless communication router, the network activity communication to the external server.

Publications cited throughout this document are hereby incorporated by reference in their entirety. While one or more embodiments of the present disclosure have been described, it is understood that these embodiments are illustrative only, and not restrictive, and that many modifications may become apparent to those of ordinary skill in the art, including that various embodiments of the inventive methodologies, the illustrative systems and platforms, and the illustrative devices described herein can be utilized in any combination with each other. Further still, the various steps may be carried out in any desired order (and any desired steps may be added and/or any desired steps may be eliminated).

What is claimed is:

1. A method comprising:
receiving, by at least one processor of a wireless communication network system, a network activity communication purporting to be initiated by an entity with an external entity, the network activity communication being communicated via a wireless communication router of the wireless communication network system;
determining, by the at least one processor, an authentication indicator based at least in part on a measure of similarity between network activity communication data of the network activity communication and entity data associated with the entity so as to authenticate the entity initiator of the network activity communication, wherein the authentication indicator comprises a risk score indicating a degree of risk of the entity not being authentic, wherein the risk score is a numerical value on a predetermined scale; and
communicating, by the at least one processor, the authentication indicator to the external entity so as to authenticate an identity of the entity associated with the network activity communication.

2. The method of claim 1, wherein the entity data comprises device ID associated with entity device, and the network activity communication data comprises a source device ID.

3. The method of claim 1, wherein the similarity comprises whether the network activity communication data is an exact match to the entity data.

4. The method of claim 1, wherein:
the entity data comprises entity data attributes comprising at least one of:
an entity IP address,
an entity name,
an entity physical address,
an entity zip code,
an entity Media Access Control (MAC) address, or
an entity Universal unique identifier (UUID); and the network activity communication data comprises network activity communication data attributes comprising at least one of:

a network activity communication IP address,
a network activity communication name,
a network activity communication physical address,
a network activity communication zip code,
a network activity communication Media Access Control (MAC) address, or
a network activity communication Universal unique identifier (UUID); and the similarity comprises a similarity measure indicative of a degree of a match between the network activity communication data attributes and the entity data attributes.

5. The method of claim 1, wherein the authentication indicator comprises a binary risk label indicating the network activity communication as authenticated or not authenticated.

6. The method of claim 1, further comprising:
determining, by the at least one processor, that the network activity communication is associated with an authentication service based at least in part on a universal resource locator (URL) of the network activity communication;
wherein the authentication service is further configured to:
queue the entity authentication indicator in a message queue associated with the external entity; and
communicate the entity authentication indicator to an external server of the external entity in response to a query associated with the network activity communication from the external server to the authentication service.

7. The method of claim 1, further comprising:
transmitting, by the wireless communication router, the network activity communication to an external server of the external entity.

8. A method comprising:
receiving, by at least one processor of a wireless communication network system, via at least one graphical entity interface, at least one entity selection defining network activity communication data of a network activity communication to an external server of an entity, the network activity communication being configured to initiate a network activity with the external server;
determining, by the at least one processor, that the entity is an external entity based at least in part on the network activity communication data and a trigger address list specifying a plurality of network addresses of a plurality of enrolled entities;
determining, by the at least one processor, an authentication indicator based at least in part on a measure of similarity between network activity communication data of the network activity communication and entity data associated with the entity so as to authenticate the entity initiator of the network activity communication, wherein the authentication indicator comprises a risk score indicating a degree of risk of the entity not being authentic, wherein the risk score is a numerical value on a predetermined scale; and
communicating, by the at least one processor, the authentication indicator to the external entity so as to authenticate an identity of the entity associated with the network activity communication.

9. The method of claim 8, wherein the entity data comprises device ID associated with the entity device, and the network activity communication data comprises a source device ID.

10. The method of claim 8, wherein the similarity comprises whether the network activity communication data is an exact match to the entity data.

11. The method of claim 8, wherein:
the entity data comprises entity data attributes comprising at least one of:
an entity IP address,
an entity name,
an entity physical address,
an entity zip code,
an entity Media Access Control (MAC) address, or
an entity Universal unique identifier (UUID); and
the network activity communication data comprises network activity communication data attributes comprising at least one of:
a network activity communication IP address,
a network activity communication name,
a network activity communication physical address,
a network activity communication zip code,
a network activity communication Media Access Control (MAC) address, or
a network activity communication Universal unique identifier (UUID); and
the similarity comprises a similarity measure indicative of a degree of a match between the network activity communication data attributes and the entity data attributes.

12. The method of claim 8, wherein the entity authentication indicator comprises a binary risk label indicating the network activity communication as authenticated or not authenticated.

13. The method of claim 9, further comprising:
determining, by the at least one processor, that the network activity communication is associated with an authentication service based at least in part on a universal resource locator (URL) of the network activity communication;
wherein the authentication service is further configured to:
queue the entity authentication indicator in a message queue associated with the external entity; and
communicate the entity authentication indicator to an external server of the external entity in response to a query associated with the network activity communication from the external server to the authentication service.

14. The method of claim 8, further comprising:
transmitting, by the at least one processor, the network activity communication to the external server.

15. A wireless communication network system comprising:
at least one processor in communication with at least one non-transitory computer readable medium having software instructions stored thereon, wherein the at least one processor, upon execution of the software instructions, is configured to:
receive a network activity communication purporting to be initiated by a entity with an external entity, the network activity communication being communicated via a wireless communication router of the wireless communication network system;
determine an authentication indicator based at least in part on a measure of similarity between network activity communication data of the network activity communication and entity data associated with the entity so as to authenticate the entity initiator of the network activity communication, wherein the authentication indicator comprises a risk score indicating a degree of risk of the entity not being authentic, wherein the risk score is a numerical value on a predetermined scale; and communicate the authentication indicator to the external entity so as to authenticate an identity of the entity associated with the network activity communication.

16. The wireless communication network system of claim 15, wherein the entity authentication indicator comprises a binary risk label indicating the network activity communication as authenticated or not authenticated.

17. The wireless communication network system of claim 15, wherein the at least one processor, upon execution of the software instructions, is further configured to:

determining, by the at least one processor, that the network activity communication is associated with an authentication service based at least in part on a universal resource locator (URL) of the network activity communication;

wherein the authentication service is further configured to:

queue the entity authentication indicator in a message queue associated with the external entity; and communicate the entity authentication indicator to an external server of the external entity in response to a query associated with the network activity communication from the external server of the external entity to the authentication service.

18. The wireless communication network system of claim 15, wherein the at least one processor, upon execution of the software instructions, is further configured to:

transmit the network activity communication to an external server of the external entity.

* * * * *